United States Patent [19]

Hermann

[11] Patent Number: 5,524,486
[45] Date of Patent: Jun. 11, 1996

[54] DEVICE FOR MEASURING, CONTROLLING AND/OR DETECTING THE FILLING LEVEL IN A CONTAINER

[76] Inventor: Eberhard F. Hermann, Sonnenweg 3, D 79618 Rheinfelden 5, Germany

[21] Appl. No.: 248,128

[22] Filed: May 24, 1994

[30] Foreign Application Priority Data

Jun. 5, 1993 [DE] Germany .......................... 43 18 750.1

[51] Int. Cl.⁶ ..................................... G01F 23/00
[52] U.S. Cl. ....................................... 73/290 V
[58] Field of Search .................. 73/290 V; 248/638; 340/618, 621; 310/321, 323; 367/908

[56] References Cited

U.S. PATENT DOCUMENTS

| | | | |
|---|---|---|---|
| 3,184,968 | 5/1965 | Werner | 73/290 V |
| 3,228,523 | 1/1966 | Boyd et al. | 73/290 V |
| 4,170,311 | 10/1979 | Spaw | 73/290 V |
| 4,226,118 | 10/1980 | Aldrich | 73/290 V |
| 4,383,443 | 6/1983 | Langdon | 73/290 V |
| 4,499,765 | 2/1985 | Benz et al. | 73/290 V |
| 4,785,663 | 11/1988 | Hermann . | |
| 4,896,536 | 1/1990 | Benz | 73/290 V |

FOREIGN PATENT DOCUMENTS

| | | |
|---|---|---|
| 1140249 | 1/1983 | Canada . |
| 3011603C2 | 4/1983 | Germany . |
| 3140938C2 | 2/1991 | Germany . |

Primary Examiner—William A. Cuchlinski, Jr.
Assistant Examiner—Andrew Hirshfeld
Attorney, Agent, or Firm—Quarles & Brady

[57] ABSTRACT

A fill level indicating device of the rod-in-tube type has a pair of propping struts gusseting the vibratory tube to the membrane and to the membrane support. One strut is arranged above the vibratory tube and the other below, with both struts aligned in a common plane which is vertical when the device is installed in a container. The vibration excitation and detection systems are arranged on the membrane at 90° to the plane of the struts, so that with the device installed in a container the direction of vibration is horizontal. The membrane is made with thickened portions extending through its middle in the direction of vibration. Material may be removed from the thickened portions by grinding or filing to tune the device to the desired resonant frequency. In addition or as an alternative to the thickened portions of the membrane, ridges oriented opposite to the direction of vibration may be provided on an end wall of the vibratory tube from which material may be removed to tune the device to the desired resonant frequency.

16 Claims, 2 Drawing Sheets

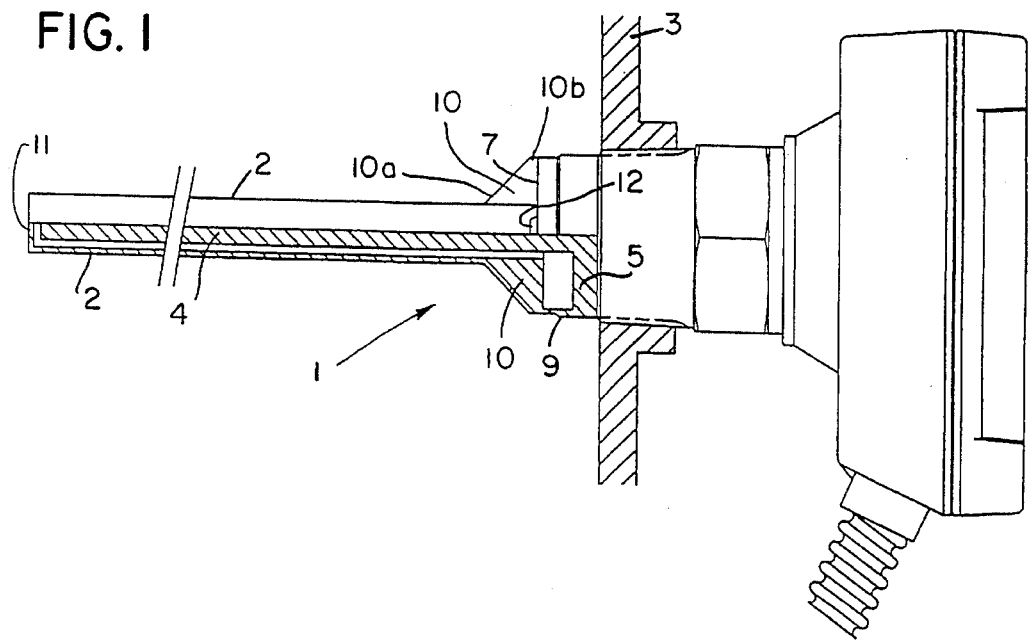
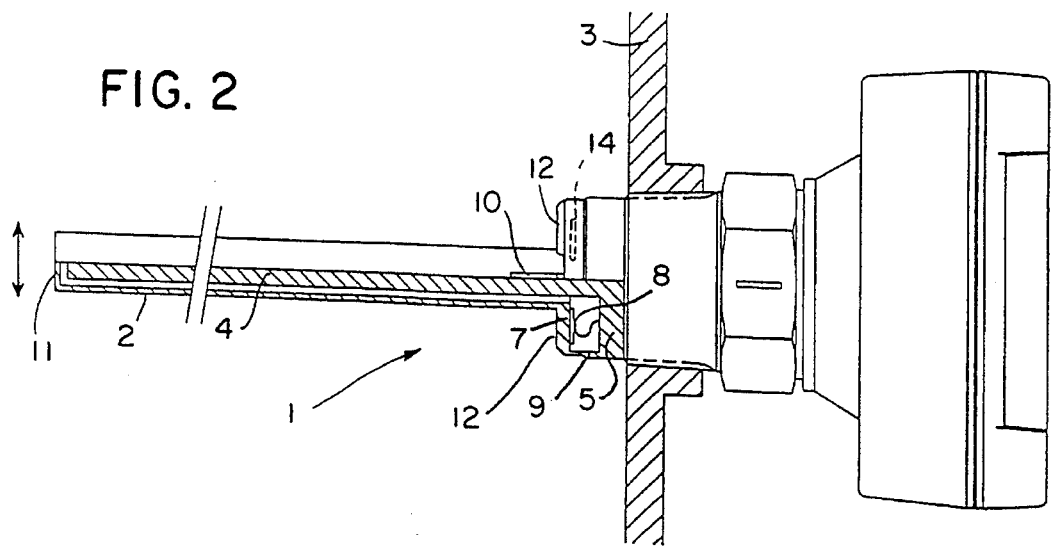

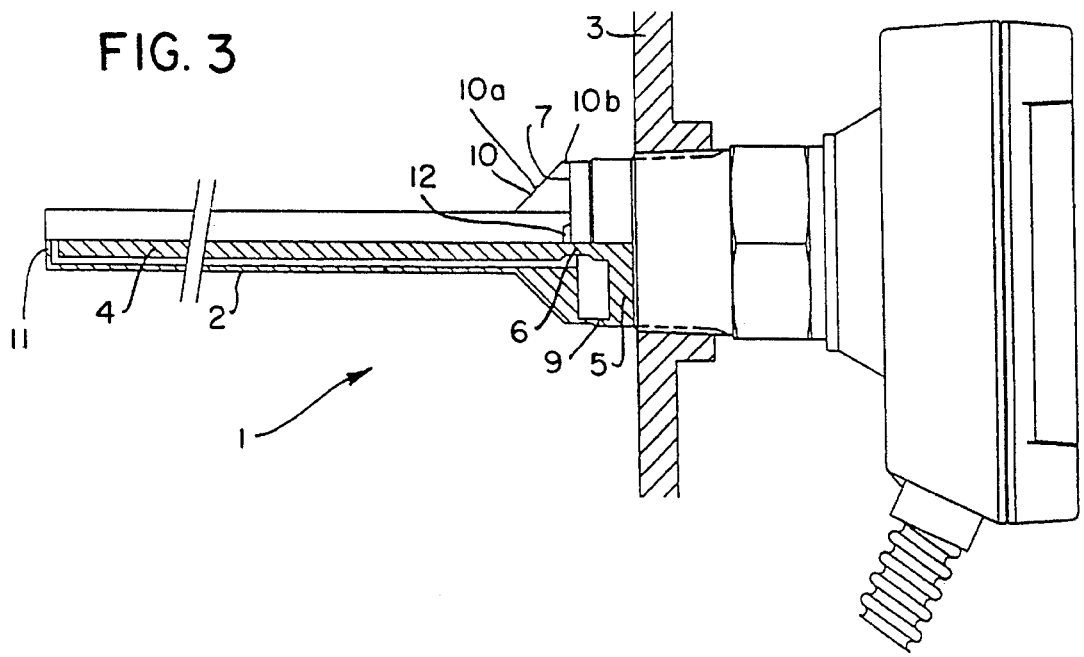
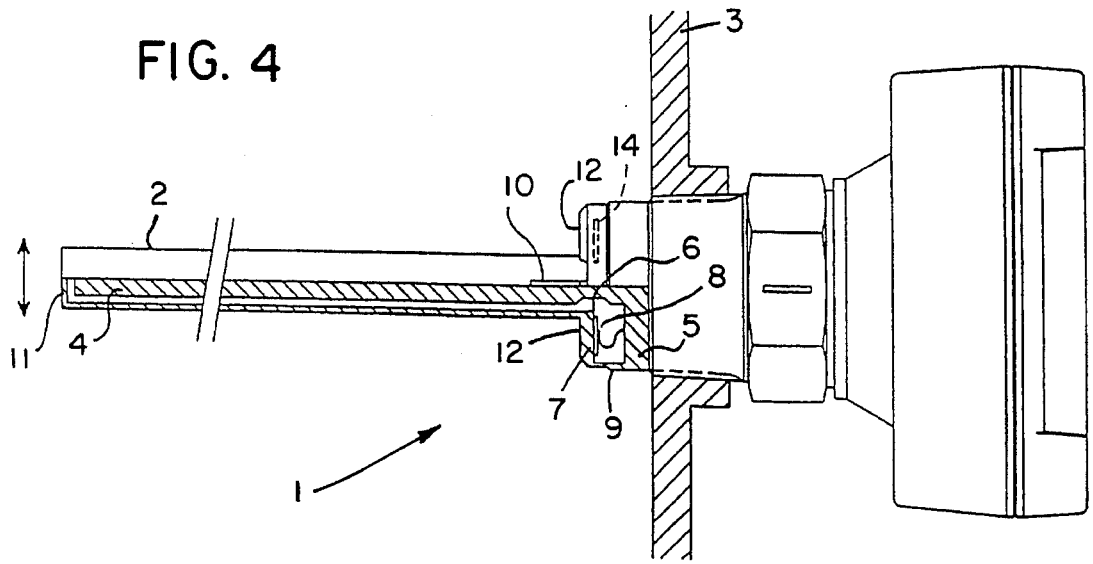

DEVICE FOR MEASURING, CONTROLLING AND/OR DETECTING THE FILLING LEVEL IN A CONTAINER

BACKGROUND OF THE INVENTION

This invention relates to a device for controlling, measuring and/or detecting the filling level in a container. In particular, this invention relates to such a device of the type having concentric vibratory elements which extend into the container.

DISCUSSION OF THE PRIOR ART

Devices for controlling, measuring and/or detecting the filling level in a container having a first vibratory element whose vibration gets damped when it contacts the filling material are known. In some types of such known devices, the vibratory element extends into the container and is tube-shaped and in the hollow space of this first tube-shaped vibratory element a second rod-shaped vibratory element is arranged which has the same resonant frequency as the first vibratory element and is vibrating in opposite phase. The first vibratory element is fixed onto an elastic membrane which has a vibration exciting and a vibration pick-up system and has its outer edge connected by means of a short tube to a plate which holds the second rod-shaped vibratory element so that the two vibratory elements are connected to each other, making a vibratory system. Devices of this type are known, for example, from German patent nos. DE-29 33 618, DE-30 11 603 C2 or from DE-31 40 938 C2. By this kind of construction one gains the advantage that almost no vibration energy gets transferred to the container wall through which the device extends into the container, so that these kinds of devices have a high sensitivity even against extremely light-weight filling material.

In practice, however, it has been shown that the membrane, being necessarily relatively flexible because of the required vibrations, may be deformed by overload, i.e., it may get bent so that the device cannot be used any more.

Such an overload may especially happen when the device is installed horizontally in the lower part of a container in order to control minimum level. In such a case the filling material flows over the first tube-shaped vibratory element which extends into the container. When the container is emptied, depending on the density of the filling material, the filling material can excite high forces onto this vibratory element by which the membrane can be bent. If the membrane is deformed beyond its elastic limit, for example by such an emptying process or by a sudden impact of falling clumped filling material onto the vibratory element, the device cannot work correctly any more or may be completely destroyed.

Therefore, it is known to protect from above such devices in the interior of the containers by means of a protection plate. This, however, means increased installation effort and higher costs. In addition, a protection plate for such a measuring device is normally installed approximately horizontally extending from the container wall into the interior with a length according to the length of the vibratory device or a bit longer. As the granular or powdered filling material does not flow like a liquid under such a protection plate, there will always be a more or less large free space (free of filling material) under this protection plate even when the container is filled. If the device is installed too near to the protection plate, the vibrating rod may extend into this free space, thus causing an incorrect signal of the level control instrument. Therefore, the protection plate must be installed with a sufficiently large distance over the device. Furthermore, there is not always enough space to install such a protection plate. To simply make the membrane stronger is not possible because this would disturb the vibration characteristics of the device.

SUMMARY OF THE INVENTION

Therefore, it is an object of the invention to create an adequate device where the deformations and bendings of the membrane caused by filling material can be avoided, so that a protecting plate is not needed, and so that parts belonging to the vibratory system, especially the first vibratory element itself or the membrane, do not have to be constructed in a complicated manner and so that the vibration characteristics of the membrane are not detrimentally influenced.

The solution of this apparently contradictory task is that at the transition from the first tube-shaped vibratory element to the membrane holding it there is provided at least one propping strut connecting the membrane and the first vibratory element, and that the connecting line between the vibration exciting system and the vibration pick-up system on the membrane is arranged crosswise to the propping strut.

In one direction the system gets more stiff and strong which protects the system against overload while the vibration of the vibratory element and of the membrane which acts crosswise is not adversely affected.

As normally the loading of the filling material acts from top downwards it is functionally that the connecting line from the vibration exciting system to the vibration pick-up system and thus the vibration direction is horizontal. As the vibration is excited in a horizontal plane the propping strut is oriented vertically (i.e., from top downwards or vice-versa) and thereby can act against the forces onto the vibrating device which are caused by the downward flowing or falling filling material without impeding the vibration of the vibratory element.

It is especially useful for the protection against overload if on the top side as well as on the bottom side of the first vibratory element a propping strut is fixed in the vertical direction. Thereby the two propping struts can be arranged in alignment in a common vertical plane which is at the same time the vertical diameter plane of the tube-shaped first vibratory element. Advantageously the vibratory element may be of a simple tube shape. This is reinforced with the propping strut(s) to counteract relatively high forces acting from the top downwards, without bending the membrane.

It is also useful that at least one of the propping struts extends to the edge of the membrane and to the tube-shaped support of the membrane. By this the forces absorbed by the propping struts can be conducted to the tube-shaped support of the membrane to protect the membrane itself from these forces. In the horizontal direction, however, the membrane stays flexible so that the vibrations in this direction are practically not impeded. A vertical additional load caused by the filling material is, however, efficiently anticipated.

The propping strut or struts may end even with the outer edge of the tube-shaped support of the membrane or rise above a little. Thereby in any case the forces are conducted via the propping struts into the support of the membrane.

The propping struts may be flat plates whose axial dimensions along the outside of the first vibratory element correspond to the radial dimension on the membrane or are larger. The propping strut or struts may be bevelled or rounded on the edge opposite to the side which is fixed to the first vibratory element and the bevelling may be about 45°. Thus with minimum material an effective reinforcement of the membrane and of the vibratory system is obtained in the direction of the forces caused by the filling material without disturbing the vibration characteristic in the cross direction and thereby the function of the instrument.

With hitherto known devices of this kind it is usual to make the necessary frequency adjustment of the vibratory elements by machining thinner the membrane on a lathe, e.g. until the resonant frequency is reached. Because of the propping strut or struts according to this invention, however, this is not possible.

One execution of the invention provides on the side of the membrane from which the tube-shaped vibratory element and the propping struts start, beside the propping struts and/or on the closed end wall of the first vibratory element, material thickenings which may be reduced, e.g. by filing, in order to adjust the resonant frequency of the system. In spite of the propping struts by this provision a frequency adjustment is possible.

Thereby the thickness of the membrane may be chosen thinner from the very beginning than it would be necessary for the correct resonant frequency and by means of the material thickenings the membrane may be reinforced more than necessary to reach the required frequency. By continuously reducing the material thickenings the resonant frequency can be adjusted.

The material thickenings may have the shape of one or more ridges which may preferably lie in the vibrating plane. Such a ridge which functionally extends over a space of the diameter can easily and quickly be reduced by means of a file in order to make the frequency adjustment.

In addition or instead of this the material thickening at the end of the vibratory element may be constructed as a ridge in the vertical direction. By this also at this position the frequency adjustment can be made by removing material without disruption by the propping strut(s).

The material thickenings or ridges on the membrane may be bevelled towards the membrane and/or the material thickenings or ridges on the end wall of the first vibratory element may be bevelled towards the end wall. Thereby one avoids the accumulation of filling material in crevices or corners which may otherwise be formed by these ridges.

Seemingly contradictory a membrane thickness is chosen thinner than necessary and in addition across the membrane at least one reinforcing ridge is provided which functionally lies in the plane of the vibration, i.e. in the preferred embodiment in a horizontal plane, and which has a thickness which is sufficient to increase the spring force of the membrane so that the desired resonant frequency is reached. In order to compensate for tolerances which occur in practice, this reinforcing ridge on the membrane is chosen thicker than necessary so that the resonant frequency of the outer first vibratory element is too high. A frequency adjustment can then easily be made by reducing the height of the reinforcing ridge by filing or grinding.

Over all the invention provides a device which can withstand vertical forces caused by filling material so that the membrane does not get bent, without any protection shield or other extraneous device, and where the vibrations in the horizontal direction are not disturbed so that an exact level control is possible. Thereby, the first vibratory element can be constructed advantageously as a simple tube-shaped vibratory element with circular cross section, which is inexpensive and reliable.

Embodiments of the invention are described in detail by means of drawings, in which:

FIG. 1 shows a side view of a device according to this invention in its lower half shown as a partial longitudinal sectional view, it being understood that said device is symmetrical about its center line, where the inner second vibratory element is a bending vibrator;

FIG. 2 shows a top view of the device of FIG. 1 in a half partial longitudinal sectional view, it being understood that said device is symmetrical about its center line;

FIG. 3 shows a side view of a device according to this invention in its lower half shown as a partial longitudinal sectional view, it being understood that said device is symmetrical about its center line, where the inner second vibratory element is a rotary vibrator; and FIG. 4 shows a top view of the device of FIG. 3 shown in a half partial longitudinal sectional view, it being understood that said device is symmetrical about its center line.

The two complete devices marked with 1 (FIGS. 1–2 and FIGS. 3–4), differ only concerning their inner vibratory elements 4. Both devices 1 are used to measure, control and/or detect the filling level in a container, and have been identified with the same numbers concerning the corresponding parts in the following description.

In both embodiments the device 1 has one first vibratory element 2, whose vibration gets damped when it contacts filling material in container 3. The first vibratory element 2 extends horizontally into the container through its wall 3 and is tube-shaped. In the hollow space of this first tube-shaped vibratory element 2 there is arranged a second rod-shaped vibratory element 4 which has the same resonant frequency as the first vibratory element 2 and which vibrates in opposite phase when the device is operated.

The difference between the two embodiments is that in the embodiment according to FIGS. 1 and 2, the second vibratory element 4 is fixed to a stiff plate 5, thus acting as a bending vibrator, while in the embodiment according to FIGS. 3 and 4 between the stiff plate 5 and the rod-shaped vibratory element 4 there is a center of rotation 6 in the form of a material recess provided around the circumference of the element 4 so that in this case the second vibratory element 4 acts as a rotating vibrator.

The first vibratory element 2 is fixed to a flexible membrane 7 which bears one vibration exciting system 8 (FIGS. 2 and 4) and 180° opposite to the system 8 a vibration pick-up system 14. The vibration pick-up system 14 is shown in the drawings in hidden lines since the top half of FIGS. 2 and 4 are not shown in section. As shown in FIGS. 2 and 4 the vibration pick-up system 14 is the mirror image of the system 8 shown in the lower half of FIGS. 2 and 4, the device being symmetrical about its centerline. The flexible membrane 7 is connected at its outer edge by means of a tube-shaped mounting device 9 to the stiff plate 5. The two vibration elements 2 and 4 are thus connected together thereby making a vibration system in which the forces and deviations caused by the vibrations of the two vibratory elements compensate each other, so that practically no vibration energy is transferred to the container wall 3. Such vibration exciting and pick-up systems and rod-in-tube vibration systems are well known in the art.

At the transition from the first tube-shaped vibratory element 2 to the membrane 7 bearing it, there are arranged the two propping struts 10 connecting the membrane 7 and the first vibratory element 2 in such an orientation that the connecting line between the vibration exciting system 8 and the vibration pick-up system on the membrane 7 lies crosswise (at 90°) to the plane of the propping struts.

According to FIGS. 2 and 4 the connecting line from the vibration exciting system 8 to the vibration pick-up system 14 runs horizontally and thus also the vibration acts in a horizontal plane. According to FIGS. 1 and 3 on each of the upper side and on the lower side of the first vibratory element 2 there is provided a propping strut 10 oriented vertically. Also from FIGS. 2 and 4 it can be seen that the propping struts 10 are aligned and are arranged in a common vertical plane which at the same time is also the vertical diameter plane of the outer, tube-shaped vibratory element 2. As the propping struts 10 have a certain thickness their center exactly lies in the mentioned vertical diameter plane.

This shows that in vertical direction there is a reinforcement of the vibration system which acts against additional loads caused by the filling material while at the same time in horizontal direction the membrane 7 stays flexible so that the necessary vibration for the level control is possible. That means that two apparently contradictory requirements are enabled, namely to keep the membrane flexible for vibrations and at the same time to reinforce the membrane against excessive loads.

Each propping strut 10 according to FIGS. 1 and 3 extends to the edge of membrane 7 and to its tube-shaped support 9 and ends even with the outer edge or the outer periphery of the tube-shaped support 9. Thus from these propping struts 10 load forces from the element 2 can be absorbed and transferred via the tube-shaped support 9 to the stiff plate 5. Thereby, the membrane 7 is be protected from these forces caused by the filling material which in general act from the top downward.

The propping struts 10 according to FIGS. 2 and 4 are flat plates whose axial dimension along the outside of the first vibratory element 2 corresponds approximately to the radial dimension of the membrane 7 or is a little larger. Thereby the propping struts are bevelled at the radially outer side 10a, which is opposite to the side which is fixed to the element 2, the bevelling being at about 45°. If the axial dimension of the propping struts 10 on the first vibratory element 2 is larger than the radial dimension of the membrane, there is at the top end (or the bottom end for the lower strut 10) of the membrane a short straight transit 10b to the support 9.

Due to tolerances in production it may happen that the resonant frequencies of the system are not correct. Therefore, the thickness of the membrane 7 is made thinner than required to get the correct resonant frequency of the vibratory element 2. In addition, on the side of the membrane 7 where the tube-shaped vibrator element 2 and the propping struts 10 start (i.e., the exposed side), beside the propping struts 10, there are material thickenings provided which may be reduced, e.g. by filing or grinding, in order to adjust the resonant frequency of the system.

Instead or in addition it also would be possible to provide on the closed end wall 11 of the first vibratory element 2 one or more of such material thickenings 13. These material thickenings 13 are constructed as one or more ridges running in a direction which is 90° to the direction of vibration and which have bevelled edges. The resonant frequency of the first vibratory element 2 is too low in this case and can be adjusted to the right value by taking off material.

In the disclosed embodiments the material thickening has the shape of a reinforcing ridge 12 which extends on both sides of the propping struts 10 in the vibration direction or plane on membrane 7.

The reinforcing ridge 12 runs according to FIGS. 1 and 3 over the horizontal middle of the membrane 7. In FIGS. 2 and 4 it is shown that this reinforcing ridge 12 runs on both sides of the propping struts from the outside of the vibratory element 2 to the edge of the membrane 7. As it is arranged in vibration direction it can affect the vibration characteristics accordingly.

From FIG. 1 and 3 it appears that this ridge 12 on membrane 7 is bevelled towards membrane 7 so that on this horizontally running reinforcing ridge 12 on both sides of the propping struts 10 no filling material can deposit. Thereby the reinforcing ridges 12 enable an easy frequency adjustment. The reinforcing ridges 12 are so dimensioned to increase the spring force of the membrane 7 so that by removing material from the ridges the desired resonant frequency can be obtained.

By a reasonable stiffening and reinforcing thus in total a device 1 is created with a low-cost, simple vibrating system consisting of a first tube-shaped vibratory system 2 with a circular cross section and a corresponding second vibratory element 4, which can withstand overloads due to filling material and still is able to vibrate with the desired frequency.

Thus a protection plate on top of device 1 with the associated expensive and complicated construction can be avoided. In spite of the propping struts 10, which do not allow machining by lathe the outside of the membrane 7, an easy frequency adjustment is nonetheless made possible by means of reinforcing ridges 12 which are arranged on both sides of the propping struts 10 on the horizontal diameter of membrane 7.

The device 1 for measuring, controlling and/or detecting whether filling material is in a container, has a first vibratory element 2, whose vibrations are damped by contact with filling material, whereby this vibratory element 2 has the shape of a tube with circular cross section and where in its hollow space a second rod-shaped vibratory element 4 is arranged which has the same resonant frequency as the first vibratory element 2 and vibrates in opposite phase.

The first vibratory element 2 thereby is supported by a flexible membrane 7 which has a vibration exciting system 8 and a vibration pick-up system 14 whereby the vibration exciting system 8 and the vibration pick-up system are opposite each other to the center of membrane 7 on a horizontal diameter. The outer edge of membrane 7 is connected via a tube-shaped support 9 with a stiff plate 5 which bears the second rod-shaped vibratory element 4, so that the vibratory elements 2 and 4 are connected together and form a vibratory system, where practically no vibrating energy gets transmitted to the wall 3 of the container. At the transition from the first tube-shaped vibratory element 2 to the membrane 7 bearing the vibratory element 2 there is a propping strut 10 mounted to the connecting membrane 7 and the vibratory element 2 and acting against excessive loads and possible permanent deformation of membrane 7. The connecting line between the vibration exciting system 8 and the vibration pick-up system 14 on the membrane 7 runs crosswise to the propping struts 10 (i.e., at 90° to the effective direction of the struts 10), so that vibration excitation and detection are unimpeded horizontally when the propping struts 10 are arranged vertically acting against the loads caused by the filling material.

I claim:

1. In a device for detecting a filling level of a filling material in a container, said device being of the type which has a first vibratory element whose vibrations are damped by contact with the filling material, said first vibratory element being adapted to extend into the container, being tube-shaped and defining an interior hollow space and having in said hollow space a second rod-shaped vibratory element which has the same resonant frequency as the first vibratory element and vibrates in opposite phase, said first vibratory element being supported by an elastic membrane which has a vibration exciting system and a vibration pick-up system and is connected to a plate which bears the second rod-shaped vibratory element, so that the two vibratory elements are connected to each other to form a vibrating system, the improvement wherein at the transition from the first vibratory element to the membrane bearing said first vibratory element at least one propping strut is arranged which connects said membrane and said first vibratory element and wherein a connecting line between the vibration exciting system and the vibration pick-up system on the membrane defines a direction of vibration and runs crosswise to a direction of the propping strut on the membrane said at least one propping strut not crossing said connecting line.

2. The improvement of claim 1, wherein the connecting line from said vibration exciting system to said vibration pick-up system and thereby also the direction of vibration is horizontal when the device is installed in said container and operating.

3. The improvement of claim 1, wherein the at least one propping strut is two propping struts, wherein at each of a top side and a bottom side of the first vibratory element one of said propping struts is provided which is oriented vertically when the device is installed in said container.

4. The improvement of claim 1, wherein the at least one propping strut is two propping struts are aligned in a common plane which is a vertical diametral plane of the first vibratory element when said device is installed in said container.

5. The improvement of claim 1, wherein said at least one propping strut extends to the edge of the membrane and to the end of a tube-shaped support of the membrane.

6. The improvement of claim 1, wherein the propping strut ends at least even with the outer edge of a support of the membrane.

7. The improvement of claim 1, wherein the at least one propping strut is a flat plate having an axial dimension along the outside of the first vibratory element, said axial dimension being approximately at least equal to a radial dimension of the propping strut as measured along the membrane.

8. The improvement of claim 1, wherein the propping strut is bevelled at its radially outer edge at approximately 45° to the first vibratory element.

9. The improvement of claim 1, further comprising material thickenings on at least one of the membrane and an end wall of the first vibratory element, wherein said material thickenings can be reduced by removing material from them in order to adjust the resonant frequency of the system.

10. The improvement of claim 9, wherein the material thickenings are on the membrane and are bevelled.

11. The improvement of claim 9, wherein the material thickenings are on the end wall and are bevelled.

12. The improvement of claim 1, wherein said membrane has a thickness that is thinner than would be necessary for a desired resonant frequency of the system if said membrane were of constant thickness, said membrane having a material thickening thereon, such that the membrane is reinforced more than necessary to reach the desired resonant frequency.

13. The improvement of claim 12, wherein the material thickening has the shape of a reinforcing ridge which runs mainly in said direction of direction.

14. The improvement of claim 13, further comprising an additional material thickening on an end wall of the first vibratory element, said additional material thickening constructed as a ridge running in a direction which is 90° to the direction of vibration.

15. The improvement of claim 14, wherein the material thickening on the end wall of the outer vibratory element has a bevelled edge.

16. The improvement of claim 1, wherein a reinforcing ridge runs in the direction of vibration across the middle of the membrane.

* * * * *

UNITED STATES PATENT AND TRADEMARK OFFICE
CERTIFICATE OF CORRECTION

Patent No.    : 5,524,486
Dated         : June 11, 1996
Inventor(s)   : Eberhard F. Hermann It is certified that error appears in the above-identified patent and that said Letters Patent is hereby corrected as shown below:

Col. 7, line 13 (claim 1) change "to a" to --to the--.

Col. 7, line 14 (claim 1) change "of the" to --of a--.

Col. 7, line 14 (claim 1) insert --,-- after "membrane".

Col. 7, line 27 (claim 4) insert --that-- after "struts".

Col. 7, line 28 (claim 4) change "is a" to --is the--.

Col. 8, line 25 (claim 13) change "direction of direction" to --direction of vibration--.

Signed and Sealed this

Twenty-fourth Day of December, 1996

Attest:

BRUCE LEHMAN

*Attesting Officer*      *Commissioner of Patents and Trademarks*